US 8,638,411 B2

(12) United States Patent
Park et al.

(10) Patent No.: US 8,638,411 B2
(45) Date of Patent: Jan. 28, 2014

(54) TRANSPARENT LIQUID CRYSTAL DISPLAY DEVICE

(75) Inventors: Se-Hong Park, Gyeonggi-Do (KR); Eung-Do Kim, Gyeonggi-Do (KR); Jong-Sin Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 82 days.

(21) Appl. No.: 12/957,791

(22) Filed: Dec. 1, 2010

(65) Prior Publication Data

US 2011/0299010 A1 Dec. 8, 2011

(30) Foreign Application Priority Data

Dec. 8, 2009 (KR) .................. 10-2009-0121359

(51) Int. Cl.
*G02F 1/1335* (2006.01)
*G02F 1/1337* (2006.01)

(52) U.S. Cl.
USPC .............................. 349/119; 349/130; 349/96

(58) Field of Classification Search
USPC .............. 349/96, 97, 117, 119, 130, 129, 120
See application file for complete search history.

(56) References Cited

U.S. PATENT DOCUMENTS

| 2005/0248707 A1 | 11/2005 | Jeon et al. |
| 2005/0248846 A1 | 11/2005 | Sakamaki |
| 2006/0176426 A1 | 8/2006 | Jeon et al. |
| 2006/0275560 A1* | 12/2006 | Fukagawa et al. ........... 428/1.31 |
| 2008/0158912 A1 | 7/2008 | Chang et al. |
| 2008/0231773 A1 | 9/2008 | Daiku |

(Continued)

FOREIGN PATENT DOCUMENTS

| CN | 1484048 A | 3/2004 |
| CN | 1745329 A | 3/2006 |

(Continued)

OTHER PUBLICATIONS

Chinese Office Action issued in corresponding Chinese Patent Application No. 201010578509.6 dated Mar. 30, 2012.

(Continued)

*Primary Examiner* — Mark Robinson
*Assistant Examiner* — Mary El Shammaa
(74) *Attorney, Agent, or Firm* — Morgan, Lewis & Bockius LLP

(57) ABSTRACT

Disclosed is a transparent liquid crystal display device provided with a compensation film of a liquid crystal panel to change the polarizing state of light in an image mode thereby enhancing a viewing angle characteristic, and the transparent liquid crystal display device may include a liquid crystal panel; a light source disposed at one side of a lower portion of the liquid crystal panel to emit light; a first polarizing plate for polarizing the light emitted from the light source; a light guide plate disposed at a lower portion of the liquid crystal panel to totally reflect the light polarized to an axis by the first polarizing plate to a lateral surface thereof and supply to the liquid crystal panel, and transmit natural light entered from a lower direction therethrough; a second polarizing plate disposed at an upper portion of the liquid crystal panel to control the amount of polarized light transmitting the liquid crystal panel; and a first positive A-film disposed at a lower portion of the liquid crystal panel to change the polarized state of the light outputted from the light guide plate and supplied to the liquid crystal panel, wherein the horizontal direction phase difference value (Re) is 120 nm.

20 Claims, 9 Drawing Sheets

(56) References Cited

U.S. PATENT DOCUMENTS

| | | | |
|---|---|---|---|
| 2008/0284948 A1* | 11/2008 | Koishi et al. | 349/96 |
| 2009/0135346 A1* | 5/2009 | Kajita et al. | 349/96 |
| 2009/0168001 A1* | 7/2009 | Ichihashi | 349/119 |
| 2010/0208176 A1* | 8/2010 | Ge et al. | 349/98 |
| 2011/0051047 A1* | 3/2011 | O'Neill et al. | 349/67 |

FOREIGN PATENT DOCUMENTS

| | | |
|---|---|---|
| CN | 101271227 A | 9/2008 |
| TW | 200604598 A | 2/2006 |
| TW | 200730935 A | 8/2007 |
| TW | 200827781 A | 7/2008 |
| TW | 201037415 A | 10/2010 |

OTHER PUBLICATIONS

KIPO—Office Action—Korean Patent Application No. 10-2009-0121359—Issued on Feb. 25, 2013.

Office Action issued by the Taiwan Intellectual Property Office on Sep. 18, 2013 in Taiwan Patent Application No. 099137351.

* cited by examiner

TRANSPARENT LIQUID CRYSTAL DISPLAY DEVICE

CROSS-REFERENCE TO RELATED APPLICATIONS

Pursuant to 35 U.S.C. §119(a), this application claims the benefit of earlier filing date and right of priority to Korean Application No. 10-2009-0121359 filed on Dec. 8, 2009, the contents of which is incorporated by reference herein in its entirety.

BACKGROUND OF THE INVENTION

1. Field of the Invention

The present invention relates to a transparent liquid crystal display device, and more particularly, to a transparent liquid crystal display device provided with a compensation film to enhance a viewing angle characteristic.

2. Description of the Related Art

In recent years, with rising interests in information displays and increasing demands to use portable information media, researches and commercialization of light-weight and thin-profile flat panel displays (FPDs) for substituting traditional displays such as cathode ray tubes (CRTs) have been actively carried out. In particular, among such FPDs, a liquid crystal display (LCD), which is a device displaying images using an optical anisotropy of liquid crystal molecules, has been actively applied to a notebook, a desktop monitor, or the like, because it is excellent in the resolution, color representation, image quality, and the like.

On the other hand, studies on a transparent display device for allowing rear objects thereof to be seen as well as capable of implementing images thereon have been actively carried out. Such a transparent display device may be applicable to vehicle front glasses or house glasses to provide the user's desired information. Therefore, the applicability of such transparent display devices may be expected to be drastically increased.

In general, it may be used an organic light-emitting display device and the like using spontaneous light for the transparent display device.

However, in case of the organic light-emitting display device, a display device thereof can be made only to be transparent, and thus it may be impossible to turn on or off the transparency to make it transparent or implement an image thereon. Also, there are various problems such as low yield, difficulty in making a large-sized display, low reliability, and the like.

As a result, it may be required to develop a liquid crystal display device capable of implementing high yield, large-sized displays, high reliability, as well as capable of implementing wide viewing angle, high luminance, high contrast ratio and full color as a transparent display device, but the liquid crystal display device cannot be used as a transparent display device. However, the liquid crystal display cannot spontaneously emit light but implement an image by using light of the backlight because a non-transparent backlight unit should be provided at a rear surface of the liquid crystal panel and also polarizing plates should be provided at both front and rear surfaces of the liquid crystal panel, respectively, to control the transmission of light. In particular, the polarizing plates provided at both front and rear surfaces of the liquid crystal panel, respectively, allows light to be transmitted therethrough when liquid crystals are driven in the liquid crystal panel, but light is in a non-transparent state when liquid crystals are not driven, and thus it is impossible to implement a transparent display.

SUMMARY OF THE INVENTION

The present invention is contrived to solve the aforementioned problem and an object of the invention is to provide a liquid crystal display device in which a compensation film of a liquid crystal panel is provided to change the polarized state of light, thereby enhancing a viewing angle characteristic.

In order to accomplish the foregoing object, a transparent liquid crystal display device may include a liquid crystal panel;

a light source disposed at one side of a lower portion of the liquid crystal panel to emit light;

a first polarizing plate for polarizing the light emitted from the light source;

a light guide plate disposed at a lower portion of the liquid crystal panel to reflect totally the light polarized in an axis-direction by the first polarizing plate to a lateral surface of the light guide plate to supply the light to the liquid crystal panel, and to transmit natural light entered from a lower direction therethrough;

a second polarizing plate disposed at an upper portion of the liquid crystal panel to control the amount of the polarized light transmitting the liquid crystal panel; and a first positive A-film disposed at a lower portion of the liquid crystal panel to change the polarized state of the light supplying to the liquid crystal panel through the light guide plate, the horizontal direction phase difference value (Re) of the first positive A-film being approximately 100-150 nm.

An optical axis of the first positive A-film may be parallel to an optical axis of the second polarizing plate, and a rubbing direction of the liquid crystal panel may be perpendicular to an optical axis of the second polarizing plate.

In addition, a triacetyl cellulose having a phase difference value of about 80-200 nm may be disposed between the first positive A-film and the liquid crystal pane, and it may further include a second positive A-film having a horizontal direction phase difference value (Re) of about 100-150 nm disposed between the liquid crystal panel and the second polarizing plate to change the polarizing state of the light outputted from the liquid crystal panel, and a triacetyl cellulose having a phase difference value of about 80-200 nm disposed between the second positive A-film and the second polarizing plate.

According to the present invention, a transparent liquid crystal display device allowing an object on the rear surface to be seen as transparent. In particular, in a transparent liquid crystal display device according to the present invention, a compensation film is disposed on the front surface or/and rear surface of the liquid crystal panel to change a main viewing angle direction thereby enhancing a viewing angle characteristic.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the present invention will be described in detail with reference to the accompanying drawings.

According to the present invention, there is provided a transparent liquid crystal display device. In particular, according to the present invention, there is provided a transparent liquid crystal display device in which a compensation film is provided therewith to enhance a viewing angle characteristic in the image mode.

Figure 1:
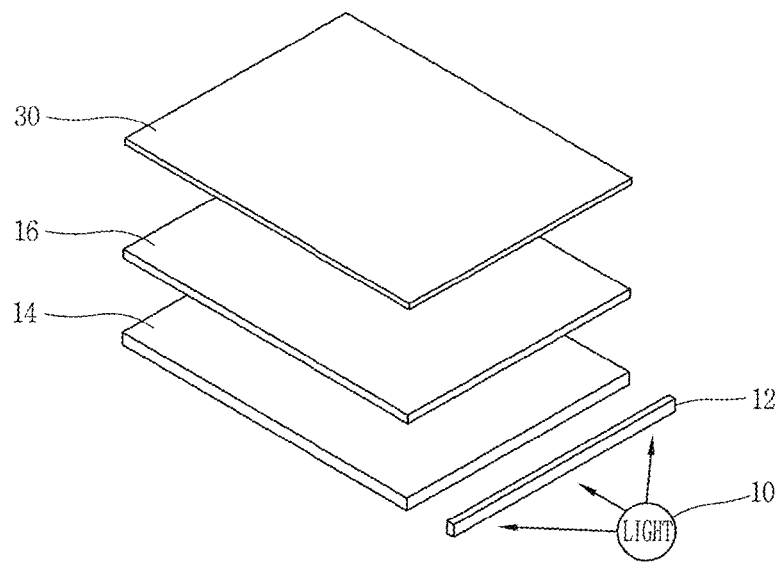
FIG. 1 is a view illustrating the structure of a transparent liquid crystal display device according to a first embodiment of the present invention.

FIG. 1 is a view illustrating the structure of a transparent liquid crystal display device according to a first embodiment of the present invention.

As illustrated in FIG. 1, a transparent liquid crystal display device 1 may include a liquid crystal panel 16, a light guide plate 14 disposed at a lower portion of the liquid crystal panel 16 to guide light to the liquid crystal panel 16, a light source 10 disposed at a lateral surface of the light guide plate 14 to emit light to the light guide plate 14, a first polarizing plate 12 disposed between the light source 10 and a lateral surface of the light guide plate 14 to polarize the light emitted from the light source to enter into the light guide plate 14, and a second polarizing plate 18 disposed at an upper portion of the liquid crystal panel 16 to polarize light transmitting through the liquid crystal panel 16.

The light source 10 is disposed in a lateral direction of the light guide plate 14. For the light source 10, it may be used a fluorescent lamp such as a cold cathode fluorescence lamp (CCFL) or external electrode fluorescent lamp (EEFL), or a plurality of light emitting devices (LEDs). In case of using LEDs, it may be used an LED that emits monochromatic light such as red, green, blue, and the like or a white LED that emits white light.

The light emitted from the light source 10 may include a first polarized light (vertical polarized light) and a second polarized light (horizontal polarized light) as visible light. The first polarizing plate 12 may be adhered to a lateral portion of the light guide plate 14. The first polarizing plate 12 is allowed to transmit only a first polarized light from the light including the first polarized light and the second polarized light.

If the light emitted from the light source 10 is entered into the first polarizing plate 12, then a second polarized light component of the light is absorbed by the first polarizing plate 12 to transmit only a first polarized light through the first polarizing plate 12. The light guide plate 14 allows the first polarized light that has passed through the first polarizing plate 12 to be entered into the liquid crystal panel 16 at an upper portion thereof.

Figure 2:
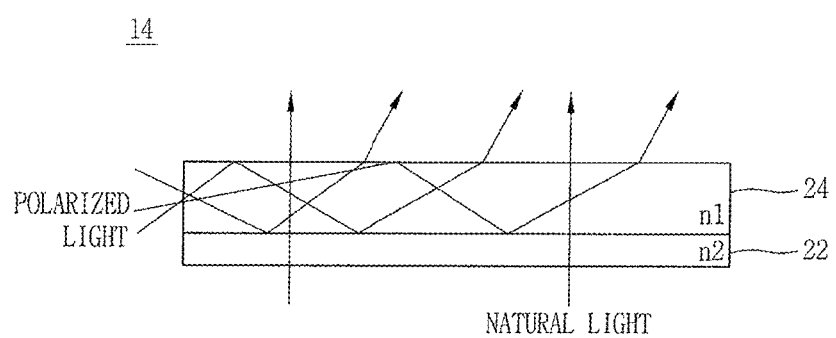
FIG. 2 is a view illustrating total reflection of light on a light guide plate of a transparent liquid crystal display device according to a first embodiment of the present invention.

As illustrated in FIG. 2, the light guide plate 14 may include a first refraction layer 22 and a second refraction layer 24.

The second refraction layer 24 is disposed to be adjacent to the liquid crystal panel 16, and the first refraction layer 22 is disposed at a lower portion of the second refraction layer 24. In other words, the first refraction layer 22 is formed and then the second refraction layer 24 is formed thereon. The first refraction layer 22 is a material having a first refractive index (n1), and may be composed of fluorinated calcium ($CaF_2$) or fluorinated magnesium ($MgF_2$), and the like. At this time, the refractive index of fluorinated calcium ($CaF_2$) is 1.35 and the refractive index of fluorinated magnesium ($MgF_2$) is 1.38. The second refraction layer 24 is a medium having a second refractive index (n2), and may be composed of a high molecular substance, such as polymer methyl methacrylate, plastic, or glass. At this time, the second refractive index (n2) may be within a range of 1.49-1.50.

As described above, since the second refractive index (n2) is greater than the first refractive index (n1), the first polarized light entered into the light guide plate 14 is totally reflected at an interface between the first refraction layer 22 and the second refraction layer 24 and entered into the liquid crystal panel 16 at an upper portion thereof. Total reflection is to reflect all light having an angle greater than the critical angle, and the critical angle (θc) may be determined by arcsin (n2/n1). Accordingly, the more the first refractive index (n1) is greater than the second refractive index (n2), the less the critical angle (θc) becomes, and thus the probability becomes higher that the first polarized light is totally reflected.

On the other hand, natural light is entered at a lower surface, i.e., from a lower direction. Natural light is passed through the first refraction layer 22 and second refraction layer 24 and entered into the liquid crystal panel 16. The transparent liquid crystal display device according to the present invention may be in a transparent state by such natural light irrespective of displaying images. Accordingly, the user at the front of the display can see an object below the light guide plate.

The liquid crystal panel 16 includes a liquid crystal layer, and thus liquid crystal molecules in the liquid crystal layer may be driven to change the phase of the first polarized light. The phase of the first polarized light that can be changed by driving liquid crystal molecules may be within a range of 0 to 90 degrees.

As described above, natural light is entered into the liquid crystal panel 16 through a lower surface of the light guide plate 14. The natural light includes both the first polarized light and the second polarized light. Accordingly, both the first polarized light and second polarized light of natural light are entered to the liquid crystal panel 16, and thus the user can see an object below the light guide plate 14 irrespective of driving liquid crystals, i.e. displaying images.

The second polarizing plate 18 has an optical axis perpendicular to the first polarizing plate 12. Accordingly, the transmission amount of light may be controlled according to a phase of the first polarized light being varied by driving liquid crystal molecules. For example, the first polarized light will not be transmitted by the second polarizing plate in case where the phase of the first polarized light is zero degrees, but the amount of the first polarized light transmitted by the second polarizing plate will be increased as the phase of the first polarized light is increased. As the amount of the first polarized light is increased, it may be possible to obtain a higher gradation.

Figure 3:
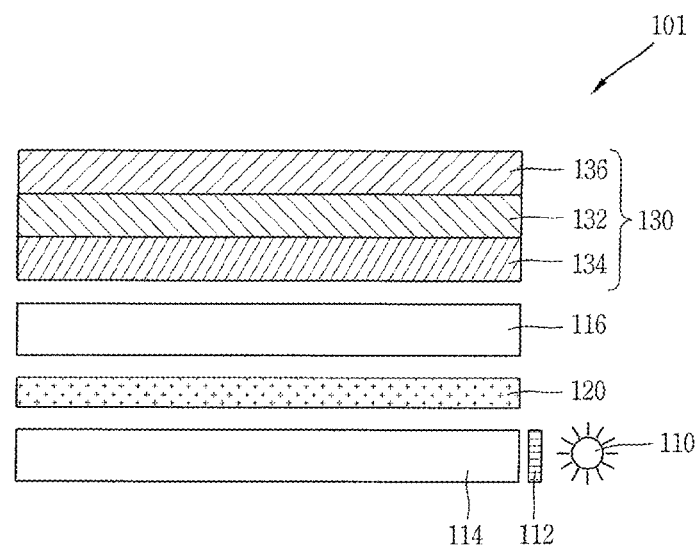
FIG. 3 is a cross-sectional view illustrating the structure of a transparent liquid crystal display device according to a second embodiment of the present invention.

FIG. 3 is a view illustrating the structure of a transparent liquid crystal display device according to a second embodiment of the present invention. In this embodiment, a compensation film is provided in a transparent liquid crystal display device as illustrated in FIG. 1, and the reason for providing a compensation film in the transparent liquid crystal display device is as follows.

As illustrated in FIG. 1, in a transparent liquid crystal display device 1, polarized light entered from a lateral surface of the light guide plate 14 is totally reflected at a lower portion of the light guide plate 14, and then supplied to the liquid crystal panel 16. Thus, as illustrated in FIG. 2, polarized light supplied to the light guide plate 14 is not entered to the liquid crystal panel 16 in a direction perpendicular to a surface of the liquid crystal panel 16, but entered in an inclined manner at a predetermined angle. Accordingly, a main viewing angle direction of the transparent liquid crystal display device 1 is not in a front direction but in a direction deviated from the front direction with a predetermined angle. As a result, when the transparent liquid crystal display device 1 is fabricated, the image quality is degraded such that the color of images in the front direction is shifted, and the like.

In the embodiment as illustrated in FIG. 3, a compensation film is provided to compensate a main viewing angle direction of the fabricated transparent liquid crystal display device 101 in the front direction, thereby preventing the image quality from being degraded.

As illustrated in FIG. 3, the transparent liquid crystal display device 101 in this embodiment may include a liquid crystal panel 116, a compensation film 120 at a lower portion of the 116, and a second polarizing plate 160 adhered to an upper portion of the liquid crystal panel 116.

Though not specifically illustrated in the drawing, the liquid crystal panel 116 is formed with a first substrate and a second substrate, and a liquid crystal layer formed between the first and second substrates. The first substrate is formed with a thin-film transistor, a pattern of gate lines and data lines, and various electrodes, and the second substrate is formed with a color filter layer for actually implementing colors and a black matrix for preventing the image quality from being degraded due to the leakage of light.

A light guide plate 114 is disposed at a lower portion of the compensation film 120, and a light source 110 is disposed at a side of the light guide plate 114. Light emitted from the light source 110 is polarized by a first polarizing plate 112 disposed between the light guide plate 114 and the light source 110, and then passed through the compensation film 120 to be supplied to the liquid crystal panel 116. In addition, natural light in the rear side of the light guide plate 114 is also transmitted through the light guide plate 114 to be supplied to the liquid crystal panel 116.

A second polarizing plate 130 may include a polarizing body 132, and a first supporting body 134 and a second supporting body 136 adhered to both surfaces of the polarizing body 132. The polarizing body 132 is a film capable of converting natural light into any polarized light. At this time, in case where incident light is divided into two polarized components crossed each other at a right angle, it may be used the polarizing body 132 having the function of allowing one polarized component to be passed therethrough but the other polarized component to be absorbed, reflected or scattered therein. An optical film used in the polarizing body 132 is not particularly limited, but it may be used, for example, a high molecular film in which a polyvinyl alcohol (PVA)-based resin containing iodine or two-color dye is used as a main component, an O-type polarizing body in which liquid crystal compositions containing a two-color material and a liquid crystal compound are aligned in a predetermined direction, an E-type polarizing body in which lyotropic liquid crystals are aligned in a predetermined direction, or the like.

The first supporting body 134 and second supporting body 136 are provided to protect the polarizing body 132, which are mainly made of a film-type material. Accordingly, any type of protective film may be used if it is possible to protect the polarizing body 132. For example, a triacetyl cellulose (TAC) or a triacetyl cellulose with no phase difference (Rth) (zero retardation TAC) may be used for the first supporting body 134 and second supporting body 136. At this time, the triacetyl cellulose preferably has a phase difference value of about 0-200 nm.

The compensation film 120 disposed at a lower portion of the liquid crystal panel 116 is a positive A-film as a uniaxial compensation film. At this time, the horizontal direction phase difference value (Re) of the compensation film 120 is 100-150 nm. The compensation film 120 may be mainly composed of a cycloolefin polymer film, a polycarbonate film, a UV-curable horizontally or vertically-aligned liquid crystal film, a polystyrene resin, a polyethylene terephthalate, and the like.

The optical axis of the second polarizing plate 130 is disposed with an angle of 0 degrees and the rubbing direction of the liquid crystal panel 116 is made with 90 degrees, and the optical axis of the compensation film 120 is disposed with an angle of 0 degrees. In other words, the optical axis of the compensation film 120 is parallel to an optical axis of the second polarizing plate 130 and perpendicular to the rubbing direction of the liquid crystal panel 116.

Liquid crystal molecules in the liquid crystal layer of the liquid crystal panel 116 are disposed along the rubbing direction of the alignment film at the time of off-state of the liquid crystal panel 116. Accordingly, the optical axis of liquid crystal molecules is also made with 90 degrees. In this manner, the reason that the rubbing direction of the liquid crystal panel 116 is made with 90 degrees is as follows.

The liquid crystal panel 116 according to the present invention is an in-plane switching (IPS) mode liquid crystal panel. In such an IPS-mode liquid crystal panel, common electrodes and pixel electrodes forming an electric field are formed on the same substrate, and thus a horizontal electrical field substantially parallel to the surface of the substrate is applied to the liquid crystal layer.

Typically, the common electrodes and pixel electrodes forming a horizontal electric field of the IPS-mode liquid crystal panel are disposed along the data lines, and thus the rubbing direction of the alignment film is made with an angle of about 15-45 degrees. However, according to the present invention, the common electrodes and pixel electrodes of the IPS-mode liquid crystal display device are bent at least once at a predetermined angle within one pixel, and the rubbing of the alignment film is made in a data line direction, namely, at an angle of 90 degrees.

Bending of the common electrodes and pixel electrodes is to form a plurality of domains having a main viewing angle in different directions within one pixel, thereby enhancing a viewing angle characteristic of the liquid crystal display device. The common electrodes and pixel electrodes are formed at a predetermined angle to the data lines and the rubbing direction of the alignment film is made in a data line direction, and thus the rubbing direction of the common electrodes and pixel electrodes are made at a predetermined angle, for example, an angle of about 15-45 degrees.

Of course, the present invention is not only limited to an IPS-mode liquid crystal display device having such a structure, but may be also applicable to an FFS-mode liquid crystal display device in which the rubbing direction is formed at 90 degrees and the direction of electrodes and the rubbing direction are formed at a predetermined angle with each other.

In this manner, in a transparent liquid crystal display device according to this embodiment, the compensation film 120 is disposed at a lower portion of the liquid crystal panel 116, and thus a main viewing angle direction of the transparent liquid crystal display device can be changed from the state inclined at a predetermined angle to the normal direction of the surface of the liquid crystal panel 116 to the state perpendicular to the surface of the liquid crystal panel 116, thereby enhancing a viewing angle characteristic.

Figure 7A:
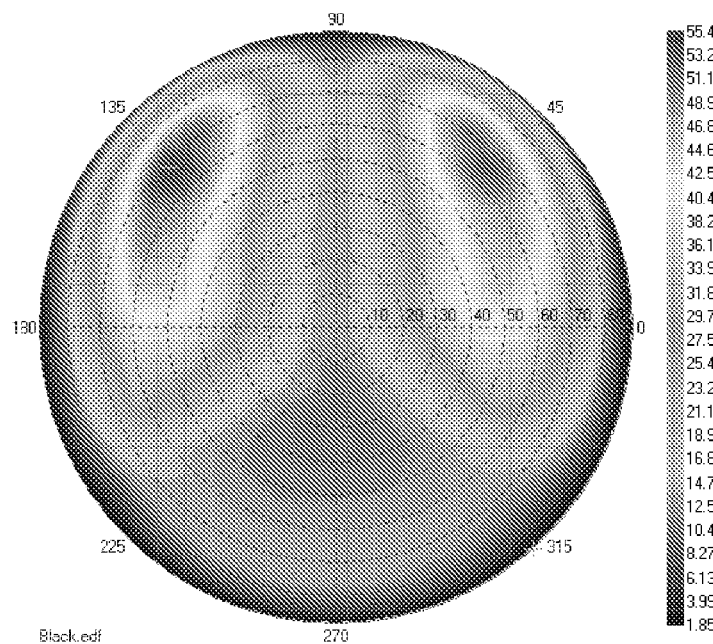
FIGS. 7a and 7b are views illustrating a luminance viewing angle characteristic in a normally-black mode in a normal direction in a transparent liquid crystal display device according to a first and second embodiment of the present invention respectively.
Figure 7B:
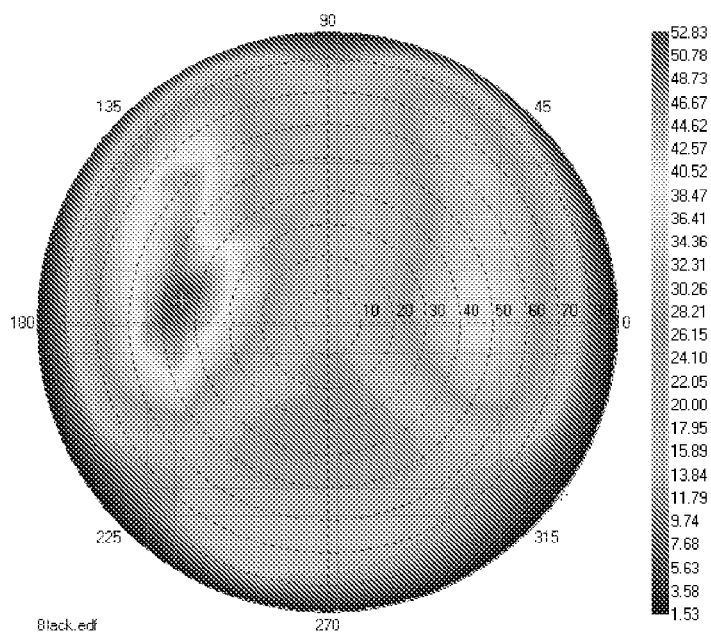

FIGS. 7a and 7b are views illustrating a luminance viewing angle characteristic in a normally-black mode in a normal direction in the image mode in a transparent liquid crystal display device (i.e., not provided with a compensation film) according to a first embodiment of the present invention and a second embodiment of the present invention, respectively.

Here, an optical axis of the liquid crystal layer is in a state perpendicular to the optical axis of the polarizing plate. At this time, FIGS. 7a and 7b illustrate a contrast ratio characteristic for a transparent liquid crystal display device according to a first embodiment at the inclination angle within a range of 0-80 degrees with respect to all longitudinal angles (or orientation angles) when using white light, and a transparent liquid crystal display device including a optical compensation film according to a second embodiment of the present invention. In FIGS. 7a and 7b, it is illustrated that the center of a circle indicates a case where the inclination angle is 0 degrees, and the inclination angle increases as increases the radius of a circle, and the values shown along the circumference indicate longitudinal angles.

As illustrated in FIGS. 7a and 7b, the light leakage increases in a normally-black mode as increases the brightness. When the contrast ratio characteristic of a transparent liquid crystal display device according to the first embodiment of FIG. 7a is compared with that of a transparent liquid crystal display device according to the second embodiment of FIG. 7b, it may be seen that the light leakage is drastically reduced at the angles of 45, 135, 225, and 315 degrees corresponding to the diagonal directions of a liquid crystal panel when in a normally-black mode. In particular, the light leakage at 45 and 135 degrees is drastically reduced. According to this, it may be seen in a normally-black mode of a transparent liquid crystal display device (provided with a compensation film) according to a second embodiment of the present invention that the luminance of a liquid crystal display device is reduced and the contrast ratio thereof is enhanced.

Figure 4:
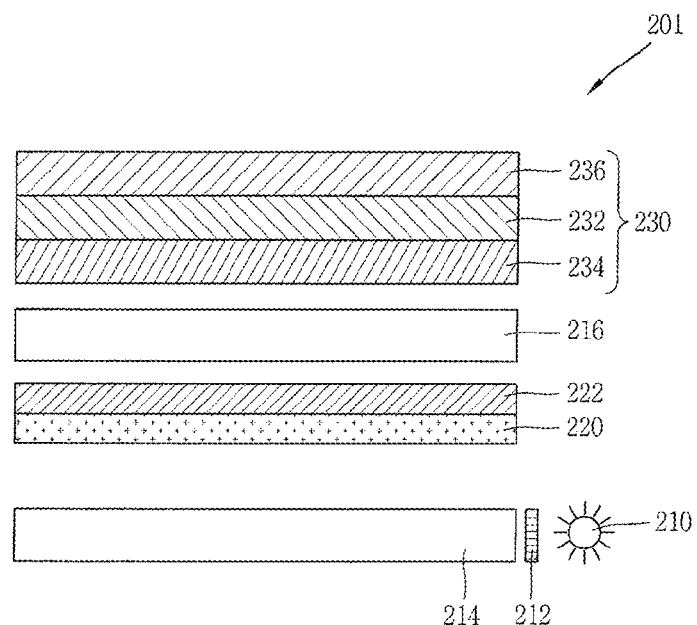
FIG. 4 is a cross-sectional view illustrating the structure of a transparent liquid crystal display device according to a third embodiment of the present invention.

FIG. 4 is a cross-sectional view illustrating a transparent liquid crystal display device 201 according to a third embodiment of the present invention.

As illustrated in FIG. 4, the transparent liquid crystal display device 201 in this embodiment may include a liquid crystal panel 216, a first compensation film 220 disposed at a lower portion of the 216, a second compensation film 222 disposed between the first compensation film 220 and the liquid crystal panel 216, and a second polarizing plate 260 adhered to an upper portion of the liquid crystal panel 216.

A light guide plate 214 is disposed at a lower portion of the first compensation film 220, and a light source 210 is disposed at a side of the light guide plate 214. Light emitted from the light source 210 is polarized by a first polarizing plate 212 disposed between the light guide plate 214 and the light source 210, and then passed through the first compensation film 220 and second compensation film 222 to be supplied to the liquid crystal panel 216. In addition, natural light in the rear side of the light guide plate 214 is also transmitted through the light guide plate 214 to be supplied to the liquid crystal panel 216.

A second polarizing plate 230 may include a polarizing body 232, and a first supporting body 234 and a second supporting body 236 adhered to both surfaces of the polarizing body 232. An optical film used in the polarizing body 232 is not particularly limited, but it may be used, for example, a high molecular film in which a polyvinyl alcohol (PVA)-based resin containing iodine or two-color dye is included as a main component, an O-type polarizing body in which liquid crystal compositions containing a two-color material and a liquid crystal compound are aligned in a predetermined direction, an E-type polarizing body in which lyotropic liquid crystals are aligned in a predetermined direction, or the like. Furthermore, a triacetyl cellulose (TAC) or a triacetyl cellulose with no phase difference (Rth) (zero retardation TAC) may be used for the first supporting body 234 and second supporting body 236. At this time, the triacetyl cellulose preferably has a phase difference value of about 0-200 nm.

The first compensation film 220 disposed at a lower portion of the liquid crystal panel 216 is a positive A-film as a uniaxial compensation film. At this time, the horizontal direction phase difference value (Re) of the first compensation film 220 is 100-150 nm. At this time, the first compensation film 220 may be mainly composed of a cycloolefin polymer film, a polycarbonate film, a UV-curable horizontally or vertically-aligned liquid crystal film, a polystyrene resin, a polyethylene terephthalate, and the like.

The optical axis of the second polarizing plate 230 is disposed with an angle of 0 degrees and the rubbing direction of the liquid crystal panel 216 is made with 90 degrees, and the optical axis of the first compensation film 220 is disposed with an angle of 0 degrees. In other words, the optical axis of the first compensation film 220 is parallel to an optical axis of the second polarizing plate 230 and perpendicular to the rubbing direction of the liquid crystal panel 216.

There is a structural difference between the transparent liquid crystal display device of this embodiment and the transparent liquid crystal display device of the second embodiment as illustrated in FIG. 3 in that a second compensation film 222 is provided between the liquid crystal panel 216 and the first compensation film 222 in the transparent liquid crystal display device of this embodiment. The second compensation film 222 is made of TAC having a phase difference of about 80-200 nm. The second compensation film 222 is a protective film formed with the same material as the first supporting body 234 and second supporting body 236 of the second polarizing plate 230. However, this film changes the polarized state of light entered from a lower portion of the liquid crystal panel 216 to perform a role of a sort of compensation film, and thus it may be referred to as a first compensation film 222.

In a transparent liquid crystal display device 201 of this embodiment, the first compensation film 220 and second compensation film 222 are disposed at a lower portion of the liquid crystal panel 216, and thus a main viewing angle direction of the transparent liquid crystal display device can be changed from the state inclined at a predetermined angle to the normal direction of the surface of the liquid crystal panel 216 to the state perpendicular to the surface of the liquid crystal panel 216, thereby enhancing a viewing angle characteristic.

Figure 8A:
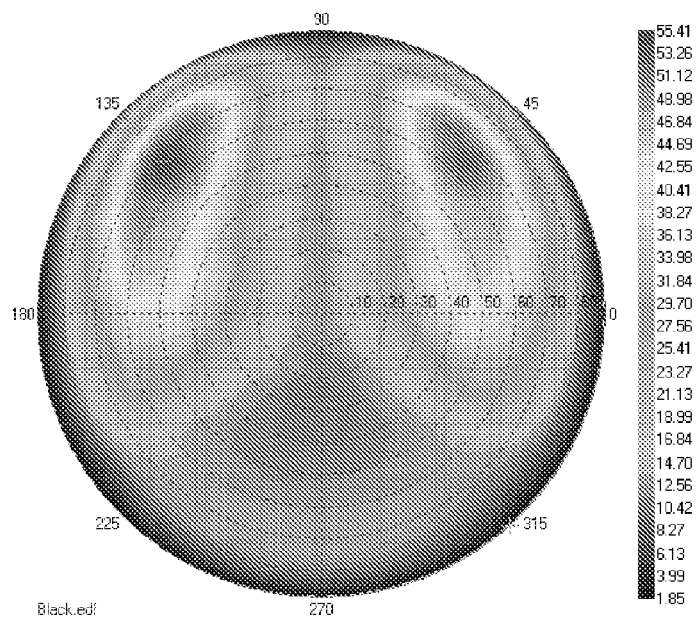
FIGS. 8a and 8b are views illustrating a luminance viewing angle characteristic in a normally-black mode in a normal direction in a transparent liquid crystal display device according to a first and third embodiment of the present invention, respectively.
Figure 8B:
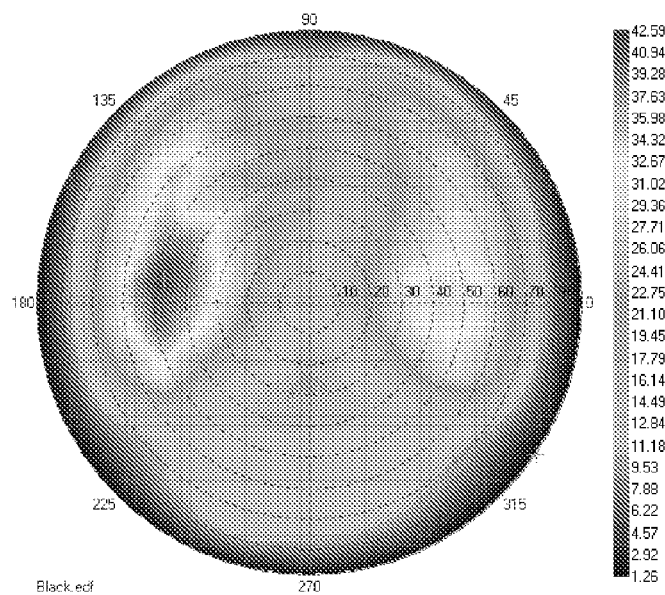

FIGS. 8a and 8b are views illustrating a luminance viewing angle characteristic in a normally-black mode in a normal direction in the image mode in a transparent liquid crystal display device (not provided with a compensation film) according to a first embodiment of the present invention and a third embodiment of the present invention.

As illustrated in FIGS. 8a and 8b, when the contrast ratio characteristic of a transparent liquid crystal display device according to the first embodiment is compared with that of a transparent liquid crystal display device according to the third embodiment, it may be seen that the light leakage is drastically reduced at the angles of 45, 135, 225, and 315 degrees corresponding to the diagonal directions of a liquid crystal panel when in a normally-black mode. In particular, the light leakage at 45 and 135 degrees is drastically reduced. According to this, it may be seen in a normally-black mode of a transparent liquid crystal display device (provided with a compensation film) according to a third embodiment of the present invention that the luminance of a liquid crystal display device is reduced, and the contrast ratio thereof is enhanced.

Figure 5:
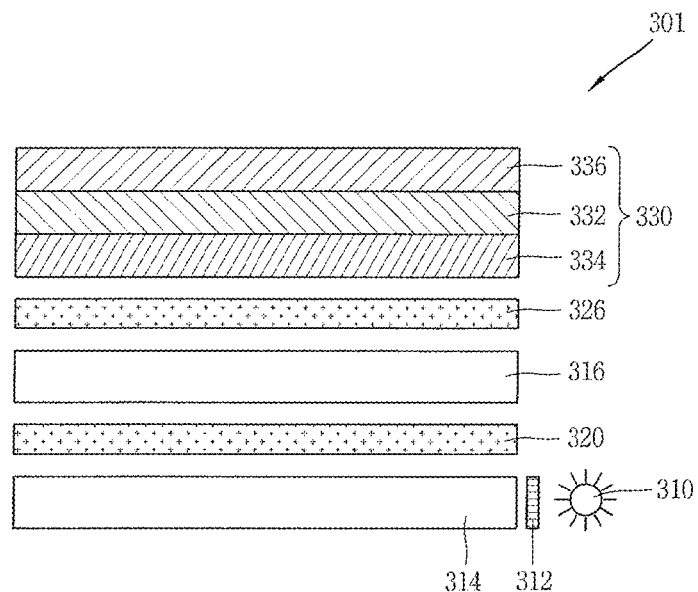
FIG. 5 is a cross-sectional view illustrating the structure of a transparent liquid crystal display device according to a fourth embodiment of the present invention.

FIG. 5 is a view illustrating a transparent liquid crystal display device 301 according to a fourth embodiment of the present invention.

As illustrated in FIG. 5, the transparent liquid crystal display device 301 in this embodiment may include a liquid crystal panel 316, a first compensation film 320 disposed at a lower portion of the 316, a second compensation film 326 disposed at an upper portion of the liquid crystal panel 316, and a second polarizing plate 360 adhered to an upper portion of the liquid crystal panel 316.

A light guide plate 314 is disposed at a lower portion of the first compensation film 320, and a light source 310 is disposed at a side of the light guide plate 314. Light emitted from the light source 310 is polarized by a first polarizing plate 312 disposed between the light guide plate 314 and the light source 310, and then passed through the first compensation film 320 to be supplied to the liquid crystal panel 316. In addition, natural light in the rear side of the light guide plate 314 is also transmitted through the light guide plate 314 to be supplied to the liquid crystal panel 316.

A second polarizing plate 330 may include a polarizing body 332, and a first supporting body 334 and a second supporting body 336 adhered to both surfaces of the polarizing body 332. An optical film used in the polarizing body 332 is not particularly limited, but it may be used, for example, a high molecular film in which a polyvinyl alcohol (PVA)-based resin containing iodine or two-color dye is included as a main component, an O-type polarizing body in which liquid crystal compositions containing a two-color material and a liquid crystal compound are aligned in a predetermined direction, an E-type polarizing body in which lyotropic liquid crystals are aligned in a predetermined direction, or the like. Furthermore, a triacetyl cellulose (TAC) or a triacetyl cellulose with no phase difference (Rth) (zero retardation TAC) may be used for the first supporting body 334 and second supporting body 336. At this time, the triacetyl cellulose preferably has a phase difference value of about 0-200 nm.

The first compensation film 320 and second compensation film 326 disposed at a lower portion and an upper portion of the liquid crystal panel 316 are a positive A-film as a uniaxial compensation film. At this time, the horizontal direction phase difference value (Re) of the first compensation film 320 and second compensation film 326 is 100-150 nm. At this time, the first compensation film 320 and second compensation film 326 may be mainly composed of a cycloolefin polymer film, a polycarbonate film, a UV-curable horizontally or vertically-aligned liquid crystal film, a polystyrene resin, a polyethylene terephthalate, and the like.

The optical axis of the second polarizing plate 330 is disposed with an angle of 0 degrees and the rubbing direction of the liquid crystal panel 316 is made with 90 degrees, and the optical axis of the first compensation film 320 is 0 degrees and the second compensation film 326 is disposed with an angle of 90 degrees. In other words, the optical axis of the first compensation film 320 is parallel to an optical axis of the second polarizing plate 330 and perpendicular to the rubbing direction of the liquid crystal panel 316, and the optical axis of the second compensation film 326 is perpendicular to an optical axis of the second polarizing plate 330 and parallel to the rubbing direction of the liquid crystal panel 316.

There is a structural difference between the transparent liquid crystal display device of this embodiment and the transparent liquid crystal display device of the second embodiment as illustrated in FIG. 3 in that a compensation film 326 made of a positive A-film is formed at an upper portion as well as a lower portion of the liquid crystal panel 316 in the transparent liquid crystal display device of this embodiment. Accordingly, the phase difference of light outputted from the liquid crystal panel 316 as well as that of light entered into the liquid crystal panel 316 may be compensated.

On the other hand, in this embodiment, the second compensation film 326 may be disposed with a negative C-film. The negative C-film may be mainly composed of a cycloolefin polymer film, a polycarbonate film, a UV-curable horizontally or vertically-aligned liquid crystal film, a polystyrene resin, a polyethylene terephthalate, and the like. At this time, a thickness direction phase difference value (Rth) of the negative C-film is 80-150 nm.

Also, in a transparent liquid crystal display device 301 of this embodiment, the first compensation film 320 and second compensation film 326 are disposed at a lower portion or an upper portion of the liquid crystal panel 316, respectively, and thus a main viewing angle direction of the transparent liquid crystal display device can be changed from the state inclined at a predetermined angle to the normal direction of the surface of the liquid crystal panel 316 to the state perpendicular to the surface of the liquid crystal panel 316, thereby enhancing a viewing angle characteristic.

Figure 9A:
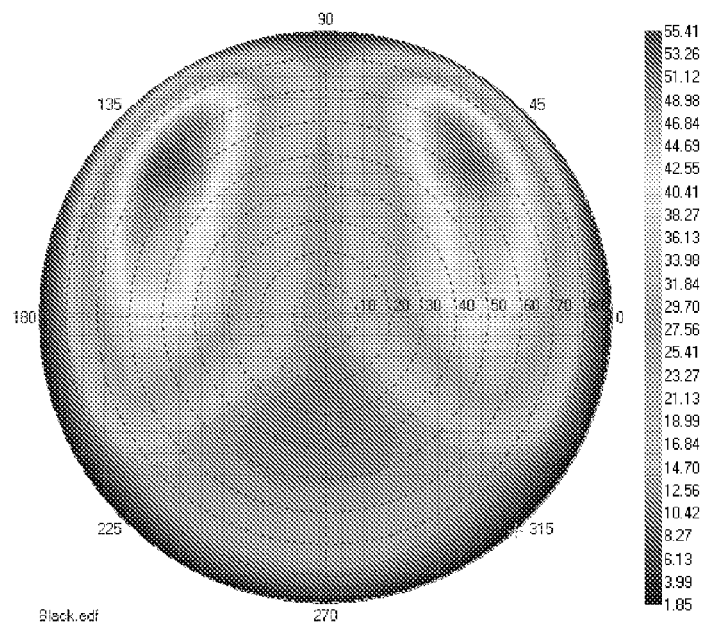
FIGS. 9a and 9b are views illustrating a luminance viewing angle characteristic in a normally-black mode in a normal direction in a transparent liquid crystal display device according to a first and fourth embodiment of the present invention, respectively.
Figure 9B:
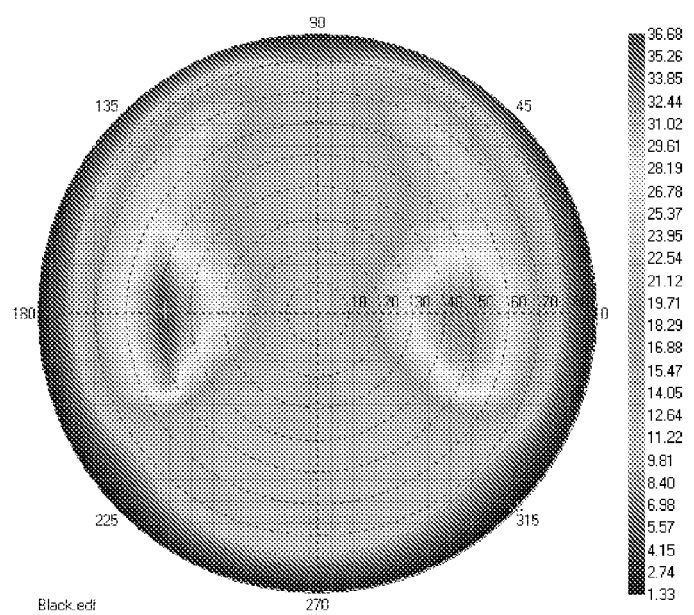

FIGS. 9a and 9b are views illustrating a luminance viewing angle characteristic in a normally-black mode in a normal direction in the image mode in a transparent liquid crystal display device (not provided with a compensation film) according to a first embodiment of the present invention and a fourth embodiment of the present invention, respectively.

As illustrated in FIGS. 9a and 9b, when the contrast ratio characteristic of a transparent liquid crystal display device according to the first embodiment is compared with that of a transparent liquid crystal display device according to the fourth embodiment, it may be seen that the light leakage is drastically reduced at the angles of 45, 135, 225, and 315 degrees corresponding to the diagonal directions of a liquid crystal panel when in a normally-black mode. In particular, the light leakage at 45 and 135 degrees is drastically reduced. According to this, it may be seen in a normally-black mode of a transparent liquid crystal display device (provided with a compensation film) of the present invention that the luminance of a liquid crystal display device is reduced, and the contrast ratio thereof is enhanced.

Figure 6:
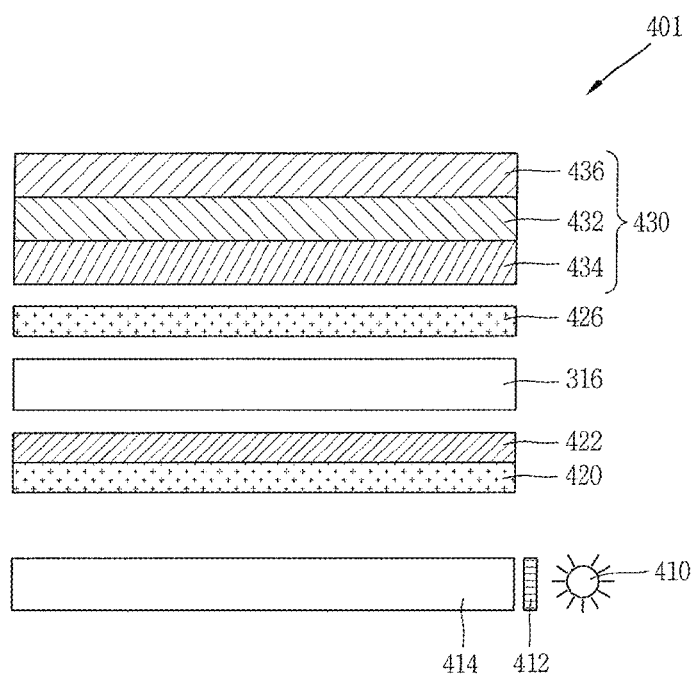
FIG. 6 is a cross-sectional view illustrating the structure of a transparent liquid crystal display device according to a fifth embodiment of the present invention.

FIG. 6 is a view illustrating a transparent liquid crystal display device 401 according to a fifth embodiment of the present invention.

As illustrated in FIG. 6, the transparent liquid crystal display device 401 in this embodiment may include a liquid crystal panel 416, a first compensation film 420 disposed at a lower portion of the 416, a second compensation film 422 disposed between the first compensation film 420 and liquid crystal panel 416, a third compensation film 426 disposed at an upper portion of the liquid crystal panel 416, and a second polarizing plate 460 adhered to an upper portion of the third compensation film 426.

A light guide plate 414 is disposed at a lower portion of the first compensation film 420, and a light source 410 is disposed at a side of the light guide plate 414. Light emitted from the light source 410 is polarized by a first polarizing plate 412 disposed between the light guide plate 414 and the light source 410, and then passed through the first compensation film 420 to be supplied to the liquid crystal panel 416. In addition, natural light in the rear side of the light guide plate 414 is also transmitted through the light guide plate 414 to be supplied to the liquid crystal panel 416.

A second polarizing plate 430 may include a polarizing body 432, and a first supporting body 434 and a second supporting body 336 adhered to both surfaces of the polarizing body 432. An optical film used in the polarizing body 432 is not particularly limited, but it may be used, for example, a high molecular film in which a polyvinyl alcohol (PVA)-based resin containing iodine or two-color dye is included as a main component, an O-type polarizing body in which liquid crystal compositions containing a two-color material and a liquid crystal compound are aligned in a predetermined direction, an E-type polarizing body in which lyotropic liquid crystals are aligned in a predetermined direction, or the like. Furthermore, a triacetyl cellulose (TAC) or a triacetyl cellulose with no phase difference (Rth) (zero retardation TAC) may be used for the first supporting body 434 and second supporting body 436. At this time, the triacetyl cellulose preferably has a phase difference value of about 0-200 nm.

The first compensation film 420 and third compensation film 326 disposed at a lower portion and an upper portion of the liquid crystal panel 416 are a positive A-film, and the second compensation film 422 is TAC.

At this time, the horizontal direction phase difference value (Re) of the first compensation film 420 and third compensation film 326 is 100-150 nm. At this time, the first compensation film 420 and third compensation film 426 may be mainly composed of a cycloolefin polymer film, a polycarbonate film, a UV-curable horizontally or vertically-aligned liquid crystal film, a polystyrene resin, a polyethylene terephthalate, and the like.

The optical axis of the second polarizing plate 430 is disposed with an angle of 0 degrees and the rubbing direction of the liquid crystal panel 416 is made with 90 degrees, and the optical axis of the first compensation film 420 is 0 degrees and the third compensation film 426 is disposed with an angle of 90 degrees. In other words, the optical axis of the first compensation film 420 is parallel to an optical axis of the second polarizing plate 430 and perpendicular to the rubbing direction of the liquid crystal panel 416, and the optical axis of the third compensation film 426 is perpendicular to an optical axis of the second polarizing plate 430 and parallel to the rubbing direction of the liquid crystal panel 416.

There is a structural difference between the transparent liquid crystal display device of this embodiment and the transparent liquid crystal display device of the fourth embodiment as illustrated in FIG. 5 in that a second compensation film made of TAC is disposed between the first compensation film 420 and liquid crystal panel 416.

On the other hand, in this embodiment, the third compensation film 426 may be disposed with a negative C-film. The negative C-film may be mainly composed of a cycloolefin polymer film, a polycarbonate film, a UV-curable horizontally or vertically-aligned liquid crystal film, a polystyrene resin, a polyethylene terephthalate, and the like. At this time, a thickness direction phase difference value (Rth) of the negative C-film is 80-150 nm.

In a transparent liquid crystal display device 401 of this embodiment, the first compensation film 420 and second compensation film 422 are disposed at a lower portion of the liquid crystal panel 416 and the third compensation film 426 is disposed at an upper portion of the liquid crystal panel 416, and thus a main viewing angle direction of the transparent liquid crystal display device can be changed from the state inclined at a predetermined angle to the normal direction of the surface of the liquid crystal panel 416 to the state perpendicular to the surface of the liquid crystal panel 416, thereby enhancing a viewing angle characteristic.

Figure 10A:
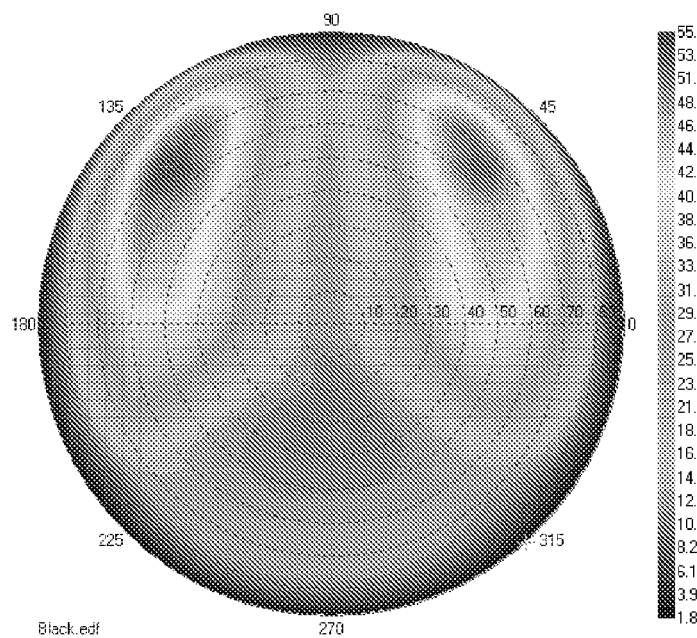
FIGS. 10a and 10b are views illustrating a luminance viewing angle characteristic in a normally-black mode in a normal direction in a transparent liquid crystal display device according to a first and fifth embodiment of the present invention, respectively.
Figure 10B:
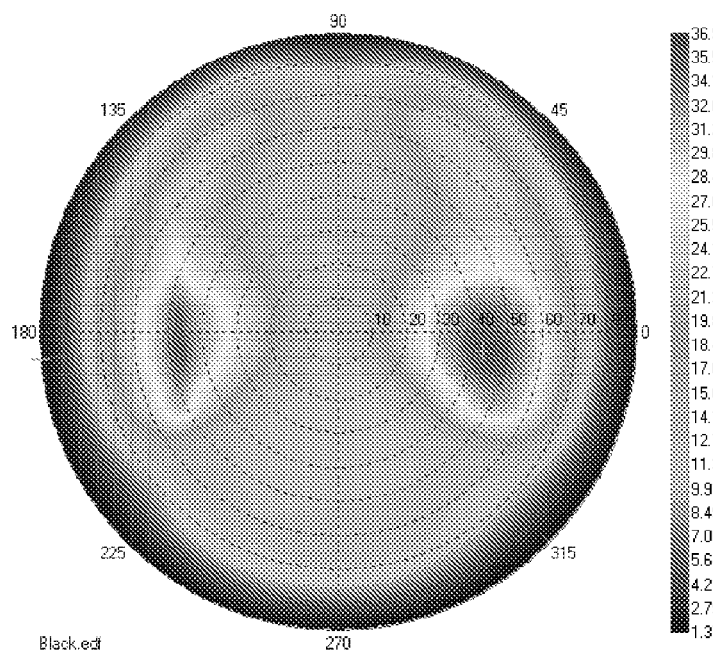

FIGS. 10a and 10b are views illustrating a luminance viewing angle characteristic in a normally-black mode in a normal direction in the image mode in a transparent liquid crystal display device (not provided with a compensation film) according to a first embodiment of the present invention and a fifth embodiment of the present invention, respectively.

As illustrated in FIGS. 10a and 10b, when the contrast ratio characteristic of a transparent liquid crystal display device according to the first embodiment is compared with that of a transparent liquid crystal display device according to the fifth embodiment, it may be seen that the light leakage is drastically reduced at the angles of 45, 135, 225, and 315 degrees corresponding to the diagonal directions of a liquid crystal panel when in a normally-black mode. In particular, the light leakage at 45 and 135 degrees is drastically reduced. According to this, it may be seen in a normally-black mode of a transparent liquid crystal display device (provided with a compensation film) of the present invention that the luminance of a liquid crystal display device is reduced, and the contrast ratio thereof is enhanced.

As described above, according to the present invention, a compensation film is disposed at the rear and front surfaces of a transparent liquid crystal display device, thereby enhancing a front viewing angle characteristic of the transparent liquid crystal display device.

Figure 11A:
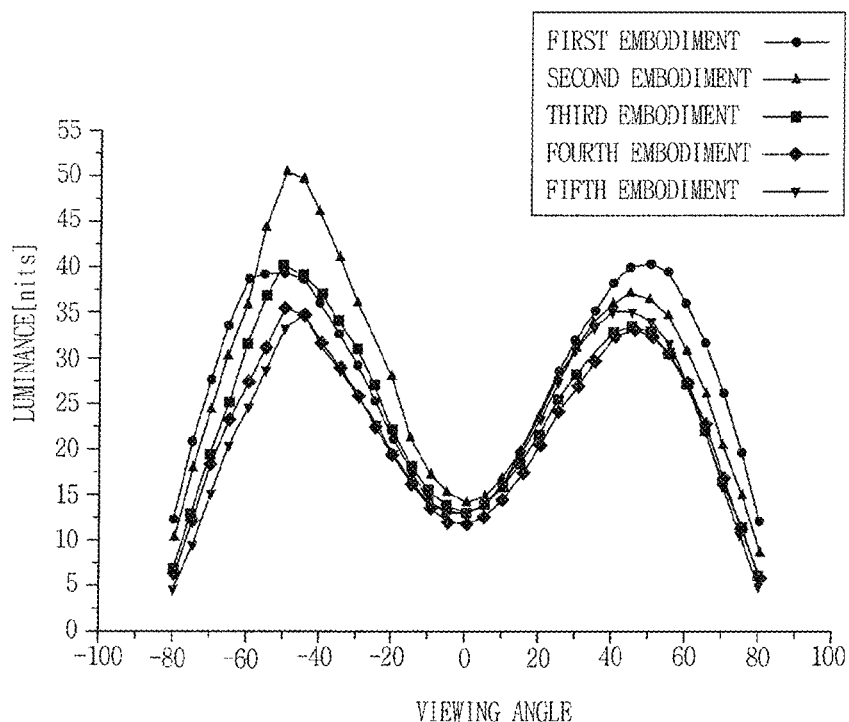
FIGS. 11a through 11d are graphs illustrating the luminance according to a viewing angle direction in a transparent liquid crystal display device according to a first through a fifth embodiments of the present invention.
Figure 11B:
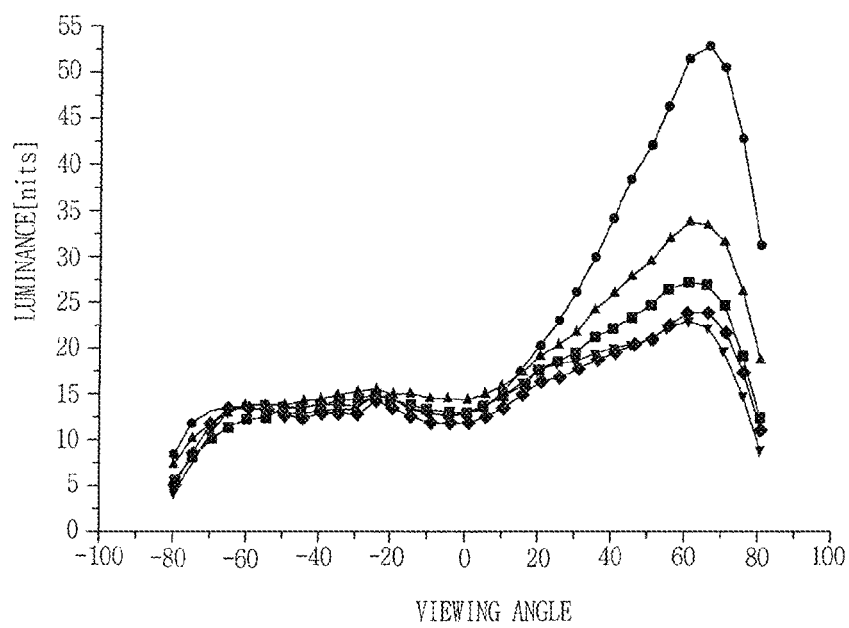
Figure 11C:
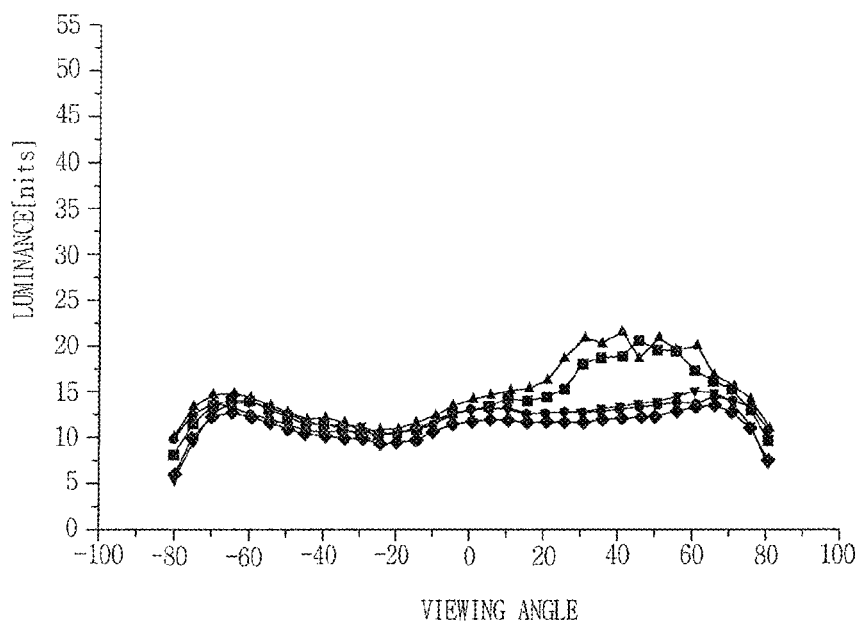
Figure 11D:
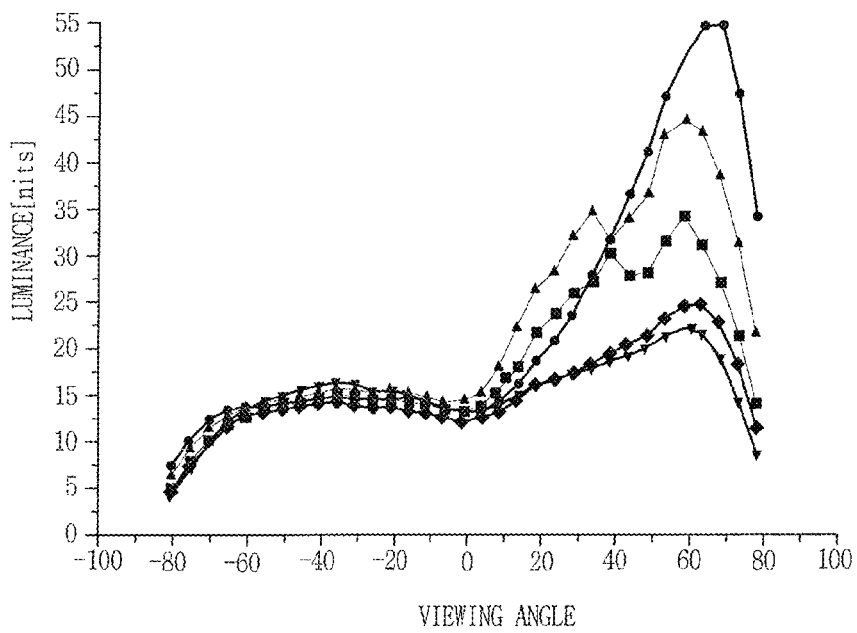

FIGS. 11a through 11d are graphs illustrating the luminance according to a viewing angle direction in a transparent liquid crystal display device according to a first through a fifth embodiments of the present invention. Here, FIG. 11a is a graph illustrating the luminance in a normally-black mode at an orientation angle of 0 degrees, and FIG. 11b is a graph illustrating the luminance in a normally-black mode at an orientation angle of 45 degrees, and FIG. 11c is a graph illustrating the luminance in a normally-black mode at an orientation angle of 90 degrees, and FIG. 11d is a graph illustrating the luminance in a normally-black mode at an orientation angle of 135 degrees.

As illustrated in FIGS. 11a through 11d, the luminance in a transparent liquid crystal display device according to the second through fifth embodiments provided with a compensation film is substantially reduced compared to a transparent liquid crystal display device according to the first embodiment provided with no compensation film. In particular, it may be seen that the luminance of a transparent liquid crystal display device according to the second through fifth embodiments is drastically reduced at a viewing angle of 75 degrees of the orientation angles of 45 and 135 degrees compared to a transparent liquid crystal display device according to the first embodiment. It implies that the luminance in a transparent liquid crystal display device according to the second through fifth embodiments provided with a compensation film is drastically reduced at an upper right diagonal direction and an upper left diagonal direction of the liquid crystal panel compared to a transparent liquid crystal display device according to the first embodiment, and thus it implies that the leakage of light is drastically reduced at those directions, thereby drastically enhancing a viewing angle characteristic of the transparent liquid crystal display device.

As described above, according to the present invention, there is provided a transparent liquid crystal display device, and more particularly, there is provided a transparent liquid crystal display device having a compensation film to enhance a viewing angle characteristic.

On the other hand, in the foregoing detailed description, though a transparent liquid crystal display device having a specific structure has been disclosed, the present invention is not limited to a transparent liquid crystal display device with the structure. The gist of the present invention relates to a transparent liquid crystal display device in which a viewing angle characteristic thereof is enhanced, and to this end various compensation films are provided in the transparent liquid crystal display device. Accordingly, the present invention may be also applicable to a transparent liquid crystal display device having any structure if a compensation film is provided therein to enhance the viewing angle characteristic. In other words, it may be applicable to a transparent liquid crystal display device having all the structures capable of implementing a liquid crystal display device in a transparent manner.

In other words, other examples or embodiments of a liquid crystal display device using the basic concept of the present invention can be easily contrived by those skilled in the art.

What is claimed is:

1. A transparent liquid crystal display device, comprising:
a liquid crystal panel;
a light guide plate disposed at a lower portion of the liquid crystal panel, the light guide plate including:
a first surface facing the liquid crystal panel;
a second surface opposing to the first surface; and
a third surface perpendicular to the first and second surfaces;
a light source facing to the third surface of the light guide plate to supply the light to the light guide plate through the third surface thereof;
a first polarizing plate between the third surface of the light guide plate and the light source to polarize the light supplied to the light guide plate;
a second polarizing plate disposed at an upper portion of the liquid crystal panel to control the amount of the polarized light transmitting the liquid crystal panel; and
a first positive A-film disposed at a lower portion of the liquid crystal panel to change the polarized state of the light supplying to the liquid crystal panel through the light guide plate, the horizontal direction phase difference value (Re) of the first positive A-film being approximately 100-150 nm,
wherein an optical axis of the first polarizing plate is perpendicular to an optical axis of the second polarizing plate,
wherein the light from the light source is polarized by the first polarizing plate such that the polarized light is incident to the light guide plate through the third surface thereof to supply to the liquid crystal panel in order to display an image, and
wherein a non-polarized natural light is incident to the light guide plate through the second surface thereof to supply to the liquid crystal panel in order to display the image of the object at a rear portion of the light guide plate.

2. The transparent liquid crystal display device of claim 1, wherein the light source comprises a cathode ray fluorescent lamp or external electrode fluorescent lamp.

3. The transparent liquid crystal display device of claim 1, wherein the light source comprises a light-emitting device (LED).

4. The transparent liquid crystal display device of claim 1, wherein the light guide plate comprises:
a first refraction layer having a first refractive index; and
a second refraction layer having a second refractive index higher than the first refractive index which is disposed on the first refraction layer.

5. The transparent liquid crystal display device of claim 1, wherein the second polarizing plate comprises:
a polarizing body; and
a first supporting body and a second supporting body adhered to the upper and lower surfaces of the polarizing body, respectively.

6. The transparent liquid crystal display device of claim 5, wherein the first supporting body and second supporting body are composed of a triacetyl cellulose or a triacetyl cellulose with no phase difference (Rth).

7. The transparent liquid crystal display device of claim 6, wherein a phase difference value of the triacetyl cellulose is about 0-200 nm.

8. The transparent liquid crystal display device of claim 5, wherein the polarizing body is composed of a polyvinyl alcohol-based resin.

9. The transparent liquid crystal display device of claim 1, wherein the first positive A-film is composed of a material selected from the group consisting of a cycloolefin polymer film, a polycarbonate film, a UV-curable horizontally-aligned liquid crystal film, a polystyrene resin, and a polyethylene terephthalate.

10. The transparent liquid crystal display device of claim 1, wherein an optical axis of the first positive A-film is parallel to an optical axis of the second polarizing plate.

11. The transparent liquid crystal display device of claim 1, wherein a rubbing direction of the liquid crystal panel is perpendicular to an optical axis of the second polarizing plate.

12. The transparent liquid crystal display device of claim 1, wherein the liquid crystal panel includes an in-plane switching (IPS) mode liquid crystal panel and fringe-field switching (FFS) mode liquid crystal panel.

13. The transparent liquid crystal display device of claim 1, further comprising:
a triacetyl cellulose having a phase difference value of about 80-200 nm disposed between the first positive A-film and the liquid crystal panel.

14. The transparent liquid crystal display device of claim 1, further comprising:
a second positive A-film having a horizontal direction phase difference value (Re) of about 100-150 nm disposed between the liquid crystal panel and the second polarizing plate to change the polarizing state of the light outputted from the liquid crystal panel.

15. The transparent liquid crystal display device of claim 1, an optical axis of the second positive A-film is perpendicular to an optical axis of the second polarizing plate.

16. The transparent liquid crystal display device of claim 14, wherein the second positive A-film is composed of a material selected from the group consisting of a cycloolefin polymer film, a polycarbonate film, a UV-curable horizontally-aligned liquid crystal film, a polystyrene resin, and a polyethylene terephthalate.

17. The transparent liquid crystal display device of claim 1, further comprising:
a second positive A-film having a horizontal direction phase difference value (Re) of about 100-150 nm disposed between the liquid crystal panel and the second polarizing plate to change the polarizing state of the light outputted from the liquid crystal panel, and
a triacetyl cellulose having a phase difference value of about 80-200 nm disposed between the second positive A-film and the second polarizing plate.

18. The transparent liquid crystal display device of claim 1, further comprising:
a negative C-film having a thickness direction phase difference value (Rth) of about 80-150 nm disposed between the liquid crystal panel and the second polarizing plate to change the polarizing state of the light outputted from the liquid crystal panel.

19. The transparent liquid crystal display device of claim 18, wherein the negative C-film is composed of a material selected from the group consisting of a cycloolefin polymer film, a polycarbonate film, a UV-curable horizontally-aligned liquid crystal film, a polystyrene resin, and a polyethylene terephthalate.

20. The transparent liquid crystal display device of claim 1, further comprising:
a negative C-film having a thickness direction phase difference value (Rth) of about 80-150 nm disposed between the liquid crystal panel and the second polarizing plate to change the polarizing state of the light outputted from the liquid crystal panel, and
a triacetyl cellulose having a phase difference value of about 80-200 nm disposed between the negative C-film and the second polarizing plate.

* * * * *